Nov. 7, 1939.  H. A. DELANO  2,179,117
ELECTRIC RESISTANCE WELDING MACHINE
Filed Aug. 22, 1936  3 Sheets-Sheet 2
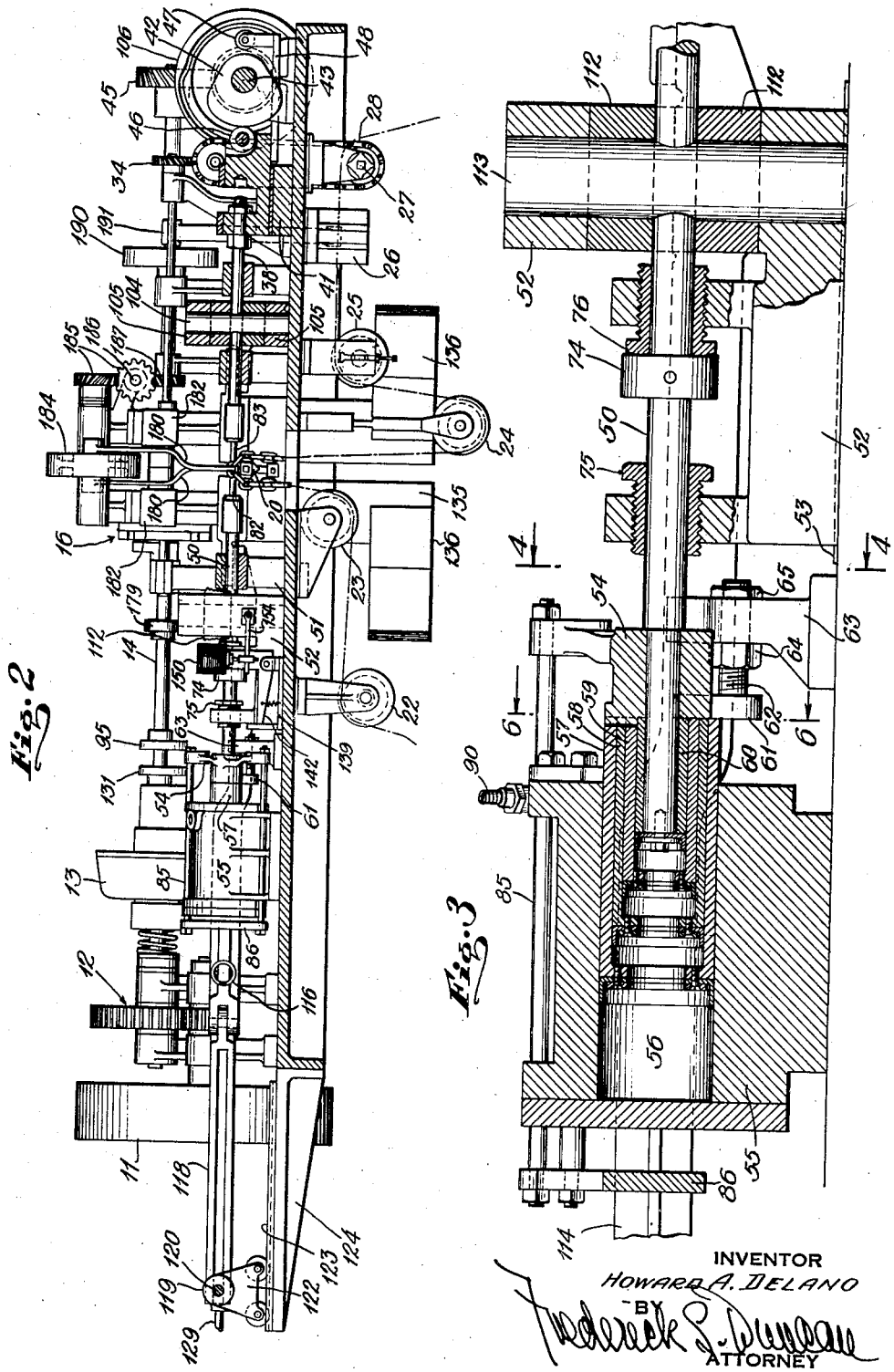
INVENTOR
HOWARD A. DELANO
BY
Frederick S. Duncan
ATTORNEY

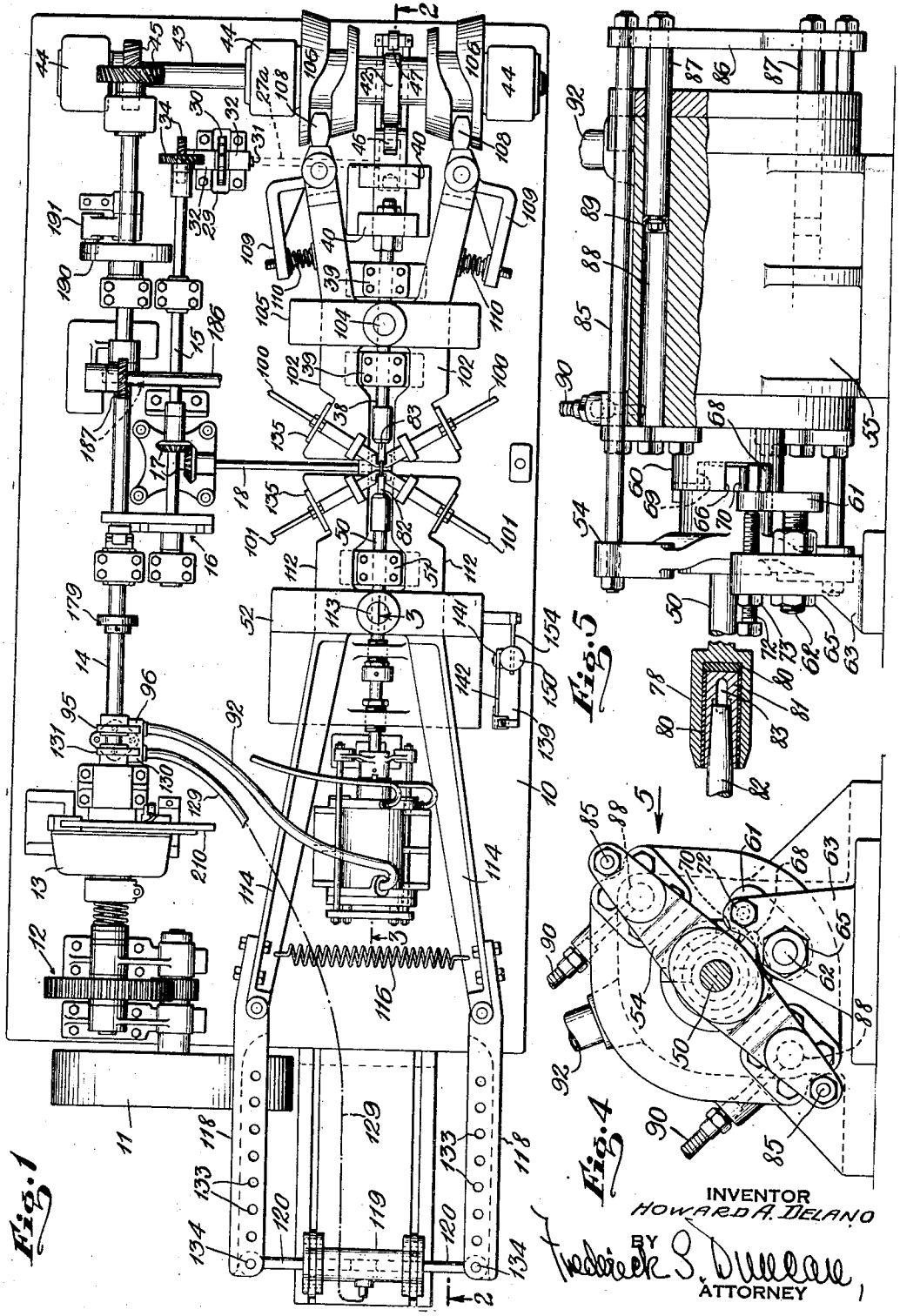

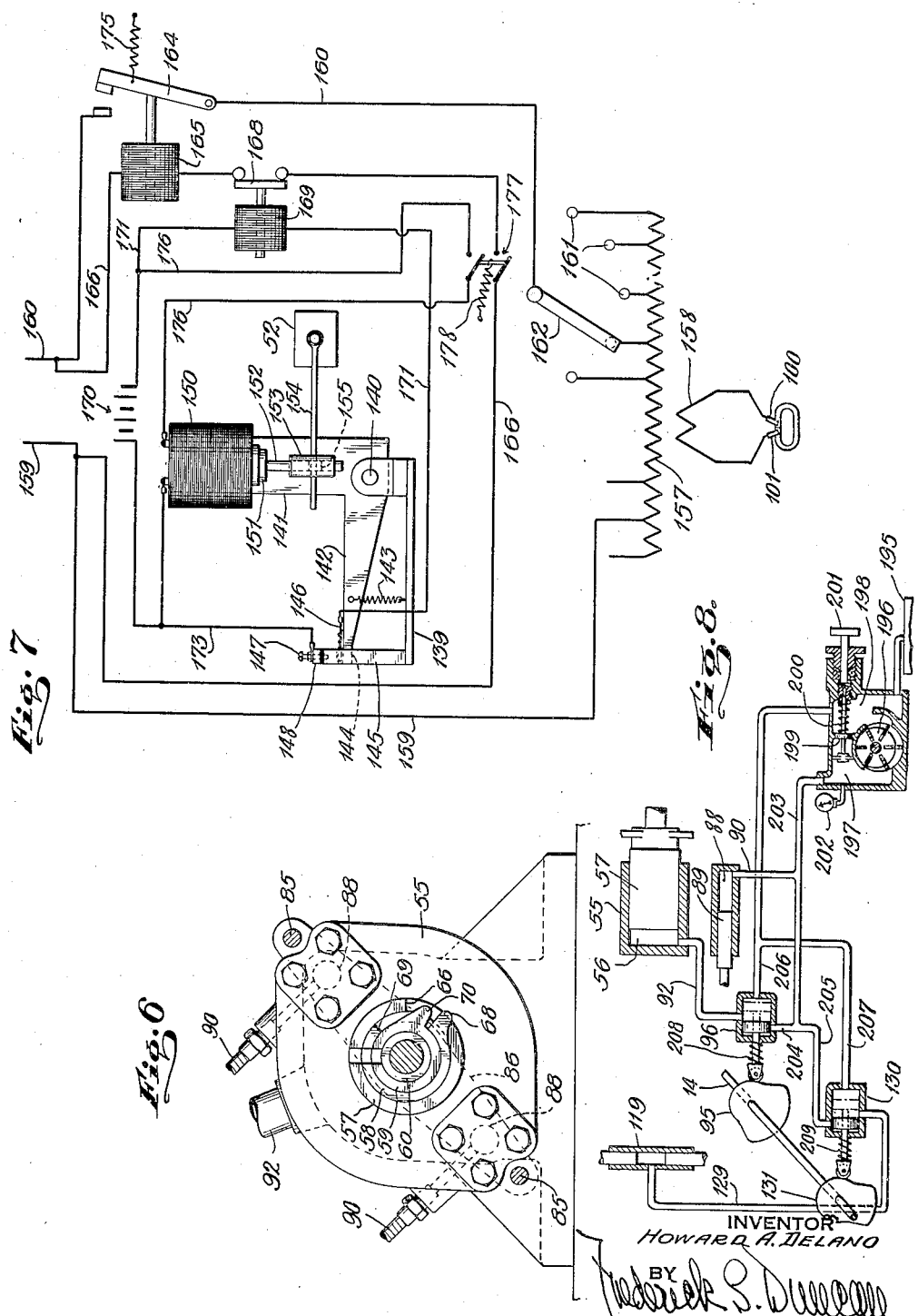

UNITED STATES PATENT OFFICE 2,179,117

ELECTRIC RESISTANCE WELDING MACHINE

Howard A. Delano, Springettsbury Township, York County, Pa., assignor to American Chain & Cable Company, Inc., a corporation of New York Application August 22, 1936, Serial No. 97,335

32 Claims. (Cl. 219—5)

The present invention has for an object to provide improvements in electric welding machines of the type in which two members are welded together by passing a heavy current through their junction point and simultaneously pressing them together as they grow plastic under the heat of said current.

The invention is particularly applicable to the welding of links of a formed chain, but, in its broader aspects, is not limited to such application.

An object of the invention is to provide improved means for controlling the application of the welding current, wherein the inherent characteristics and properties of the work, as well as the configuration of the same at the welding point, will automatically determine the duration of application of the current.

Another object of the invention is to provide for varying the pressure on the link, using a high pressure to compress the link while it is cold and automatically reducing the pressure to continue the compression as the link softens and becomes plastic.

Another object of the invention is to provide means for adjusting such pressures in accordance with the nature and characteristics of the work.

Another object is to provide means for bringing the electrodes to bear on the work in timed relation to the application of pressure thereon, the electrodes being arranged to grip the work tightly and to follow the same as it is being compressed, thereby avoiding any non-uniformity of electrical contact which might result from slippage between the work and the electrodes.

Another object of the invention is to provide a welding machine in which the compression of the work is effected by straight line pressure without the interposition of lever motions, off-set tools, etc.

A more specific object of the invention is to provide hydraulic means for compressing the work, such means being supplied by a pump with adjustable pressure control means which may be calibrated in direct pounds of maximum pressure on the work, so that the operator may conveniently adjust the pressure according to the quality and size of the material which is to be welded.

Other objects and advantages of my invention will appear in the following description of a preferred embodiment thereof, and thereafter the novelty and scope of the invention will be pointed out in the claims.

In the accompanying drawings;

Figure 1 is a plan view of the welding machine;

Fig. 2 is a view in longitudinal section taken substantially on the line 2—2 of Fig. 1;

Fig. 3 is an enlarged view in section taken on the line 3—3 of Fig. 1;

Fig. 4 is a view in transverse section taken on the line 4—4 of Fig. 3;

Fig. 5 is a view in side elevation and partly in section of the hydraulic shoving means as viewed from the rear, i. e., looking in the direction of the arrow 5 of Fig. 4;

Fig. 6 is a view in transverse section taken on the line 6—6 of Fig. 3;

Fig. 7 is a view in side elevation of an electrical control device and a diagram of electrical circuits controlled thereby; and, Fig. 8 is a diagram of the hydraulic supply system.

In the drawings the bed plate of the machine is indicated at 10. Suitably mounted on this bed plate is a driving pulley 11 which through a set of reduction gears 12 and a clutch 13 drives a main shaft 14 that is suitably mounted in brackets supported on the bed plate 10. The shaft 14 runs adjacent the rear edge of the bed plate and immediately in front of this shaft is another shaft 15 paralleling the same and intermittently driven a quarter turn by the main shaft through a Geneva drive indicated generally at 16. A pair of miter gears 17 transmit motion from the shaft 15 to an indexing shaft 18 which extends forwardly and carries at its forward end a sprocket wheel 20 (Fig. 2).

The wheel 20 is adapted to position the links at the welding point. A chain of formed links to be welded passes about a pair of guide pulleys 22 and 23 and then over the indexing wheel 20. Thence the chain passes down under a vertically adjustable pulley 24 back over a vertically adjustable pulley 25 and through a trimmer 26 mounted on the underside of the bed plate, to another indexing sprocket wheel mounted on a shaft 27. The shaft 27 is driven by a chain belt 28. The latter passes through a slot 29 in the bed plate and is driven by a sprocket wheel 30 fixed to a shaft 31 supported in brackets 32 mounted on the upper face of the bed plate. The shaft 31 in turn is driven by the intermittently operated shaft 15 through a pair of spiral gears 34. The indexing wheel on shaft 27 serves to index the links in proper position with respect to the trimmer 26.

It will be understood that the chain of links is passed twice through the machine because only the links which stand in vertical position at the welding point are welded. After such alternate links have been welded the chain is passed through the machine again with the links which were formerly in horizontal position at the welding point now turned over to vertical welding position.

At the welding point the link to be welded is engaged at opposite ends between a pair of opposed push rods, one of which is moved into operative position mechanically while the other is actuated by hydraulic means. The push rod 38 which is moved by mechanical means, is shown at the right hand side of Figs. 1 and 2, and is mounted to slide lengthwise in a pair of brackets 39—39 mounted on the bed plate. At its outer end said push rod is adjustably secured to a carriage 40 mounted to slide on ways 41 fixed to the bed plate. The carriage is moved back and forth by a cam 42 fixed to a shaft 43. The latter is mounted in brackets 44 and is driven from the main shaft 14 through a pair of helical gears 45. The cam 42 is adapted to advance the push rod by engagement with roller 46 journalled in the carriage 40 and to retract the push rod by engagement with a roller 47 carried by an extension 48 of the carriage 40.

The hydraulically driven push rod 50 is adapted to slide in a bracket 51 fixed to the bed plate and also passes through a carriage 52 mounted to slide in suitable ways 53 on the bed plate, as best shown in Fig. 3. The push rod 50 near its outer end (that is the end remote from the welding point) has a cross-head 54 fixed thereto. A cylinder block 55 is fixed to the bed plate and has a main bore 56 within which four telescoping sleeve pistons 57, 58, 59 and 60 are fitted to slide. The innermost piston 60 is fixed to the outer end of the shaft 50 and bears against the cross-head 54. The other pistons are arranged to bear also against cross-head 54 when it is desired to exert a maximum hydraulic pressure on the push rod.

Means are provided for selectively cutting off one or more of said other sleeve pistons so as to variably reduce the pressure exerted on the push rod 50. This selective means comprises a finger 61 which is carried by a threaded stem 62, the latter being adjustably clamped to a fixed bracket 63 between a pair of nuts 64 and 65. The outside sleeve piston 57 is of such diameter that it will always engage the hub of the finger 61, but the others will clear said hub. As shown in Figs. 5 and 6 the sleeve piston 57 is cut back or recessed at 66 to clear a lug 68 projecting laterally from the next inner sleeve piston 58. The latter sleeve piston is also cut back or recessed at 69 to clear a lug 70 projecting from the next inner sleeve piston 59. The finger 61, as explained above, normally will stop the outside piston 57 when the latter has been advanced to the position shown in Figs. 3 and 5. If the finger is swung to the position shown in Fig. 4 it will also engage the lug 68 to stop the sleeve piston 58 but will clear the lug 70. The finger may be swung upward from the position shown in Fig. 4 to engage also the lug 70, if so desired, so as to stop the sleeve piston 59. This would leave only the innermost sleeve piston 60 acting to advance the push rod 50. In order to brace the finger 61 when it is engaging one or both of the lugs I provide a set screw 72 threaded into the bracket 63 and bearing against the finger, as shown clearly in Fig. 5. A jam nut 73 holds the set screw in adjusted position.

Fixed upon the shaft 50 is a collar 74 which plays between a pair of adjustable sleeves 75 and 76 which are threaded into vertical extensions of the carriage 52, as shown in Fig. 3. The sleeve 76 is preferably so adjusted as to contact the collar 74 when the sleeve piston 57 encounters the stop finger 61 so that further movement of the push rod 50 due to a hydraulic pressure on piston 60 and such other pistons as are not engaged by the stop finger will cause the carriage 52 to advance with the push rod.

The push rods themselves do not actually contact with the link to be welded but are provided with thrust pins which are electrically insulated from the rods. This construction is shown in Fig. 5. It will be seen that the push rod 50 is formed with a head 78 in which there is a socket lined with insulating material, as indicated at 80. Fitted within this lining is a plug 81 formed with a tapered socket to receive a thrust pin 82 which makes the actual contact with the link to be welded. A transverse slot 83 extending through the head and plug permits of introducing a wedge to force the pin 82 out of its socket whenever so desired. By this arrangement it will be evident that the pin is insulated from the push rod. A similar construction is provided for the pin 83 of the opposite push rod 38.

The cross-head 54 of the push rod 50 is connected by tie rods 85 to a cross-head 86 at the opposite end of the block 55 and, as shown in Fig. 5, piston rods 87 are secured at one end to the cross-head 86, while their opposite ends enter bores 88 formed in the cylinder block 55. Each rod 87 is provided with a cupwasher or piston 89. Hydraulic fluid under pressure is introduced into the bores 88 through tubing 90, so that there will be a constant pressure on the pistons 89 tending to return the rod 50 to its normal retracted position. When the push rod is to be advanced into engagement with a link, oil or other hydraulic fluid under pressure is admitted through a pipe line 92 into the cylinder bore 56 causing the pistons 57, 58, 59 and 60 to move outwardly or toward the right, as viewed in Fig. 3, overcoming the pressure exerted by the fluid in the cylinder bores 88.

Admission of operating fluid to the cylinder 56 and discharge of fluid therefrom is controlled by a cam 95 fixed to the shaft 14, and operating a valve 96, as will be explained more fully hereinafter. When the fluid in cylinder 56 is connected to discharge the rod 50 returns to normal position by action of the fluid pressing upon the pistons 89, and the collar 74 upon engaging the sleeve 75 returns the carriage 52 to normal position. It will be observed that there is considerable lost motion of the collar 74 between sleeves 75 and 76, so that the actual advance and return of the carriage 52 is comparatively slight.

Welding current is supplied by two pairs of electrodes, to the link positioned at the welding point by the indexing sprocket 20, one pair 100 being disposed on one side of the joint to be welded and the other pair 101 on the other side. The electrodes 100 are carried by a pair of opposed levers 102 which are operable to move the electrodes into and out of contact with the link. The levers are pivoted intermediate their ends on a vertical pin 104. The pin is supported at the top and bottom in a yoke bracket 105 fixed to the base plate 10, and is transversely apertured to permit the push rod 38 to slide therethrough. By spreading the outer ends (the right hand ends as viewed in Fig. 1) of the levers 102 apart, the electrodes 100 are moved into firm contacting engagement with the link to be welded.

The levers are operated by a pair of opposed drum cams 106, which are fixed on the shaft 43, so that the contacting of the electrodes with the link bears a definite time relation to the thrust of the push rod 38. However, the cams do not act directly on the levers 102 but exert a resilient pressure thereon so as to allow for variations in link stock. To this end a bell crank is pivoted on the outer end of each of the levers 102. One arm 108 of this bell crank engages a cam slot in the adjacent drum cam 106, while a spring 110 is interposed between the other arm 109 of the bell crank and the adjacent lever 102. Thus, as the cams spread the arms 108 apart, the electrodes 100 will be brought into engagement with the work and the springs 110 will yield to prevent the imposition of more than a predetermined pressure of the electrodes on the work.

The electrodes 100 open only sufficiently to clear the link as it is being brought into and is being withdrawn from welding position, and they close upon the link substantially simultaneously with the forward movement of the push rod 38, because the latter is not intended to move the link but merely to provide an abutment therefor. Consequently, it is not necessary to provide for any movement of the electrodes 100 in the direction of the axis of the push rod 38. The electrodes 101, however, are adapted to move with the push rod 50 during the actual welding operation so that as the link is compressed endwise to form the weld there will be no slippage between the electrodes 101 and the link which might disturb the electrical contact therewith. The electrodes 101 are carried by two opposed levers 112 which are pivoted on a pin 113 through which passes the push rod 50. The pin 113 is supported at the top and bottom in the carriage 52, so that as the carriage is moved forward by pressure of collar 74 upon sleeve 76, it will carry the electrodes forward with it. The levers 112 have arms 114 which extend outwardly or away from the welding point and which are normally urged toward each other by means of a spring 116, thereby tending to spread the electrodes apart so as to clear the link. However, the electrodes are forced into engagement with the link by hydraulic means as will now be explained.

The arms 114 have slotted extensions 118 fixed thereto and between which is located a hydraulic cylinder 119. Slidable in and projecting in opposite directions from this cylinder are two pistons 120 which are connected respectively to the arms 118. The cylinder 119 is mounted on a carriage 122 (Fig. 2) which is arranged to run on tracks 123 supported by a bracket 124 secured to the adjacent end of the base plate 10. Hydraulic fluid under pressure is admitted to the cylinder 119 between the pistons to force them apart and thereby force the electrodes 101 into good electrical contact with the link at the welding point. The operating fluid is led to and from the cylinder 109 through a pipe line 129 under control of a valve 130 which is operated by a cam 131 on the shaft 14 to alternately admit pressure to the cylinder and release pressure therefrom. The carriage 122 permits the cylinder 119 and pistons 120 to be moved to different positions along the extensions 118 so as to vary the leverage thereon. To this end, a series of pin holes 133 is provided in each extension 118 through which pins 134 may be inserted to secure the pistons 120 at the desired adjustment.

The electrodes 100 and 101 are connected to flexible laminated leads 135 which pass through openings in the base plate 10 and are connected under the base plate to suitable bus bars 136.

Means are provided for automatically controlling the duration of application of the welding current in accordance with the cross-sectional area, and inherent characteristics of the link stock, as will now be explained. Fixed upon the bed plate 10 adjacent the carriage 52 is a bracket 139. Pivoted on this bracket at 140, as shown more clearly in Figure 7, is a bell crank lever comprising a vertical arm 141 and a horizontal arm 142. A spring 143 tends to draw the arm 142 downwardly so that its outer end normally rests upon a shoulder or step 144 formed on a post 145 carried by the bracket. Mounted on the upper edge of the arm 142 but insulated therefrom is a spring contact 146. A contact screw 147 overlies the contact 146. This screw is adjustable in a block 148 carried by but insulated from the post 145.

A solenoid 150 is mounted on the vertical arm 141. The movable core 151 of this solenoid has a downwardly projecting stem 152 which passes through a sleeve 153 secured to arm 141. A rod 154 is pivotally connected at one end to the carriage 52 and its opposite end projects through an aperture in the sleeve 153 and through a slot 155 formed in the stem 152. The arrangement is such that when the solenoid is energized the stem 152 will be drawn upwardly and will thereby clutch the rod 154 so that upon movement of the carriage 52 the bell crank lever 141—142 will be rocked on its pivot 140. Thus, after the carriage 52 has moved forward a predetermined distance the spring 146 will make contact with the screw 147, closing an electric circuit which, as will now be explained will operate to open the primary circuit of a transformer which supplies the welding current.

The primary winding of the transformer is indicated at 157 and the secondary at 158. The primary winding is supplied with current through line wires 159 and 160. The wire 159 may be connected at any one of various predetermined points to the winding 157. A number of taps 161 are also provided on the primary winding and are adapted to be engaged by a switch arm 162 connected to line 160, so as to cut out more or less of the primary winding. A circuit breaker 164 is provided in the line 160. This circuit breaker is normally open, but is adapted to be closed by a solenoid 165 in a shunt line 166 across lines 159 and 160. The shunt line includes a switch 168 which is normally closed and which is controlled by a solenoid 169. The latter is adapted to be energized by a battery 170 when the spring 146 makes contact with the screw 147. To this end a line 171 which includes the solenoid 169, is connected at one end to one pole of the battery and at the other to the spring 146, while the other pole of the battery 170 is connected by a line 173 to the contact screw 147. Thus, when the circuit through the solenoid 169 is energized by the rocking of the bell crank 141—142 and the consequent contacting of spring 146 with screw 147 the switch 168 will be opened, thereby deenergizing the solenoid 165 and permitting a spring 175 to open the circuit breaker 164.

The solenoid 150 is connected in a shunt line 176 bridging lines 173 and 171. A double pole switch 177 which is normally held open by a spring 178 is arranged to close a gap in the line 166 and also in the line 176. Thus, when this switch is closed the solenoid 165 will be energized to close the circuit breaker and supply energizing current to the primary winding 157 of the transformer, and at the same time the solenoid 150 will be energized to clutch the bell crank 141—142 to the carriage 52. The double pole switch 177 may be operated automatically by a cam 179 on the shaft 14 or this cam may be removed and the switch be operated manually.

The control provided by the mechanism just described is such that when the switch 177 is closed, such closure occurring when the push rod 50 has substantially closed the joint in the link to be welded, the welding current is automatically turned on and will continue to be applied as the link is rendered plastic by the heat of the welding current and is gradually compressed by action of the hydraulic piston or pistons in the cylinder 56. When the carriage 52 has advanced to a predetermined degree the spring 146 will contact with screw 147, thereby energizing solenoid 169 and opening switch 168. This will deenergize solenoid 165 causing the circuit breaker to open and stop the flow of energizing current to the primary 157 of the transformer.

After the weld has been formed it is swedged in the usual manner by a pair of hammer levers 180, Fig. 2, which are pivoted on a transverse shaft mounted in brackets 182. A cam 184 is mounted in vertical extensions of the brackets 182 and is driven through a pair of helical gears 185 by a shaft 186 (Fig. 1) which, in turn, is driven through a pair of helical gears 187 by the shaft 14. The cam 184 is formed in opposite faces thereof with grooves which are engaged by the hammer levers 180, so that the hammers are thereby operated at the proper period of time.

The trimmer 26 is operated in the usual manner to shear off the burr left on the link after the hammers have operated thereon. This trimmer is controlled by a cam 190 mounted on shaft 14 and operating a bell crank lever 191 which projects through an opening in the bed plate 10 and is suitably connected to the usual shearing knives in the trimmer 26.

The hydraulic pressure system is illustrated, somewhat diagrammatically, in Figure 8. Oil or other hydraulic operating fluid is pumped from a reservoir 195 by a motor driven rotary pump 196 and forced into a pressure chamber 197. In order to maintain a substantially constant pressure in this chamber a by-pass is provided connecting the pressure chamber to the suction chamber 198 of the pump and this by-pass is controlled by a valve 199. The valve is urged to closed position by a spring 200, the pressure of which may be adjusted by means of the adjusting screw 201. The strength of the spring 200 thus determines the difference in pressure between the pressure and suction chambers. A gage 202 is provided to determine the pressure in the chamber 197. Leading out of the chamber 197 is a delivery line 203 which is in constant communication with the tubing 90 leading to the cylinder 88. A branch 204 leads from the delivery line to the three-way valve 96 and another branch 205 leads to the three-way valve 130. The valve 96 is connected by pipe line 92 to the cylinder 56 and by discharge line 206 to the suction chamber 198 of the pump. Similarly, the valve 130 is connected by the pipe line 129 to the cylinder 119 and by discharge line 207 to the suction chamber 198. Normally, the valve 96 is urged by a spring 208 to a position in which the delivery line is cut-off and the line 92 connects with the line 206. Similarly, a spring 209 normally holds the valve 130 in such position as to connect lines 129 and 207 and to disconnect line 129 from the delivery line 205. When the cam 95 operates the valve 96 against the pressure of spring 208, the discharge line 206 is cut off and oil under pressure is then admitted to the cylinder 56 forcing the pistons therein outwardly against the opposing pressure of the pistons 89 in the cylinders 88. Similarly, the cam 131 operates to connect cylinder 119 to pressure and to disconnect it from the discharge line 207. The gage 202 is preferably calibrated to indicate in pounds the maximum pressure of the set of pistons in the cylinder 56 on the link that is to be welded. Hence, whenever there is a change in size or quality of the work which would require a different pressure the set screw 201 may be adjusted to increase or reduce the pressure of the spring 200 until the requisite hydraulic pressure is indicated on the gage 202.

*Operation of the machine.*—The clutch 13 is of the type which will stop automatically at the end of each complete turn and also at a predetermined intermediate point. A manually operable clutch lever 210 is provided to re-engage the clutch after each stop. A cycle of operations starts after a weld has been completed and the electrodes 100 and 101 have been withdrawn, but with the welded link still held between the push rods 38 and 50.

The first operation, after the clutch has been engaged, is for the cam 42 to start withdrawing the push rod 38 and the cam 95 to release the valve 96 so that the cylinder 56 will discharge its operating fluid and the pistons 89 will retract the push rod 50. After the push rods have been completely withdrawn the Geneva motion 16 causes shaft 15 to make a quarter turn, so that the indexing sprocket 20 will withdraw the welded link from welding position and bring the next vertically disposed link into welding position. At the same time, the indexing shaft 27 will be operated to feed the chain through the trimmer 26 so as to bring the next welded link into proper position for trimming. As soon as the links have thus been properly indexed, the cam 42 operates to force the push rod 38 forward to operative position and at the same time the cams 106 operate to force the electrodes 100 into clamping engagement with the new link at the welding point. Immediately after the push rod 38 has started forward the valve 96 is again operated by a cam 95 to admit oil under pressure to cylinder 56. This causes the entire set of telescoping pistons in the cylinder to advance against the crosshead 54 and thereby force the push rod 50 against the link. The combined pressure of the pistons is sufficient to close the gap in the joint to be welded, the finger 61 being arranged to arrest one or more of the pistons as soon as this has been effected. While the push rod 50 is being advanced pressure is admitted to the cylinder 119 by action of cam 131 on valve 130 so that the electrodes 101 close upon the link with a pressure determined by the hydraulic pressure in the cylinder 119 and the leverage provided by adjustment of the pistons 120 along the extension arms 118. The parts are so adjusted that at the time when the gap in the link is closed the collar 74 will engage the adjustable sleeve 76 and will force the carriage 52 forward with the forward motion of the push rod 50. At the same time, the cam 179 will operate to close the switch 177, thereby closing the circuit breaker 164 and admitting energizing current to the transformer. At the same time the bell crank 141—142 is clutched to the carriage 52. At this point the clutch 13 automatically disengages and shaft 14 comes to rest.

The welding current continues to flow through the link and the hydraulic pressure, now partly reduced by the arresting of one or more of the pistons in cylinder 56, continues to act on the push rod 50. As the link softens under the influence of the heat supplied by the welding current it will yield to this pressure and the push rod 50 together with the carriage 52 supporting the electrodes will slightly advance. Since the bell crank lever 141—142 is clutched to the carriage 52, forward movement of this carriage will tilt the bell crank on its axis 140 until contact is made between spring 146 and 147. This, as explained above, will energize solenoid 169, thereby opening switch 168 and deenergizing solenoid 165, so that the circuit breaker will open under influence of spring 175 and stop the flow of welding current. As the weld cools the advance of push rod 50 is arrested.

After the weld has been allowed to cool to a sufficient extent the operator re-engages clutch 13 and immediately thereafter cam 179 clears the switch 177 and spring 178 opens the same. The solenoid 150 is thus deenergized and the bell crank lever 141—142 is declutched from the carriage 52. Thereafter, the electrodes 100 are withdrawn by operation of cams 106 acting on the electrode levers 102, and simultaneously therewith the cam 131 releases valve 130 so that the fluid will discharge from cylinder 119, permitting the spring 116 to withdraw the electrode 101 from the work. While this is taking place the hammers 180 swedge the weld in the usual manner and the trimmer 26 operates to cut off the fins on the link which is in operative position in the trimmer. The push rods 38 and 50 continue to occupy their advanced position, however, and the clutch 13 now disengages a second time completing a cycle of operations.

It will be observed that the duration of application of welding current depends upon the condition of the work and is not controlled by a set time period. The work has to soften sufficiently for the parts to be moved a certain distance before the welding current is cut off and this distance may be varied for different classes of work by suitable adjustment of the set screw 147. If desired, the application of the welding current may be effected by manual operation of the switch 177 as soon as the clutch disengages the first time and the operator has to hold this switch in closed position until the circuit breaker is automatically opened. Actually, the switch 177, whether operated automatically or manually, is not closed until after the gap at the joint in the link has been closed, no matter how wide such gap may originally have been. Since the push rod is moved non-positively, that is, by hydraulic means which cannot exert more than a predetermined pressure, the push rod 50 merely stalls after closing the gap and then resumes its movement after the link has been softened by the welding current. Thereafter, the duration of application of the welding current depends upon a predetermined measure of travel of the push rod, starting from the point of actual contact of the opposed link elements at the joint. Thus, despite irregularities in a chain of formed links, such as a wide variation of spacing at the joints, or a variation of cross-section or of structural characteristics of the opposed elements at the joints, there will be a uniform compression of the links during the actual weld for any given setting of the machine, and the application of the welding current will be measured, not in time, but in distance travelled by the push rod 50, or, in other words, by the endwise contraction of the link after contact has been established between the opposed link elements.

The provision of a number of telescoping pistons acting on the push rod 50 permits of adjusting the pressure as desired during the welding operation. Full pressure is provided to close the gap in the link but thereafter the pressure is reduced in accordance with the nature of the work so as to prevent an excess of pressure which might distort the link while the weld is being made. This reduction of pressure during the shove is controlled by the finger 61 which may cut off one or more of the pistons while the maximum pressure is controlled by adjusting the spring pressure on the by-pass valve 199 in the pump.

An important feature of my invention consists in the mechanism whereby the electrodes when they engage the work do not slip with respect to the work but by reason of engagement of collar 74 with the adjustable sleeve 76 on the carriage 52 the electrodes 101 travel forward with the push rod 50 and hence with the link as it is being compressed, thereby insuring a perfect electrical contact during the welding operation.

The machine may readily be adjusted to take care of larger or smaller links. To this end, the point at which the outside piston or pistons operating on push rod 50 are cut off, may be adjusted by varying the position of finger 61 with respect to bracket 63. Also, the lost motion between adjustable sleeves 75 and 76 may be regulated and the sleeve 76 may be adjusted to start the forward movement of the carriage 52 at the desired point in the travel of the push rod 50. The pressure of the electrodes 100 upon the work is also adjustable for various sizes of work and because of the resilient operative connection with cams 106, while the pressure of electrodes 101 may be regulated by varying the points of engagement of pistons 120 with extension arms 118.

It is common practice in various resistance welders to employ means which functions to interrupt the welding current as a squeezing jaw reaches any preselected position of its travel. If such means were employed in chain link welding machines, links formed slightly short would be underheated and links formed slightly long would be overheated and the lengths of the welded links would be the same but the welded joints would not be of the same strength and would not be uniformly strong. By using the means disclosed in this application, whether the links are long or short, the welding current is left on until the amount of compression of the weld amounts to a predetermined figure at which time the welding current is turned off. The welded joints will be uniformly strong. Obviously unwelded links initially long and unwelded links initially short, will, after welding, be respectively long and short and not of uniform length but this is not objectionable.

This machine completely controls the length of welding time based on the ability of the material to withstand pressure which is fundamentally connected with the temperature of the material in the welded zone.

The particular type of cut-off disclosed measures the temperature by the plasticity of the metal heated, a measurement which for a given alloy is just as accurate as measurement of temperature, and more accurate by far than any measurement of time.

The cut-off of the current at a predetermined time is controlled by an adjustment and is effective without reference to the position of the thrust member relative to a fixed part of the machine. In other words, if the link to be welded should be long or short it would not affect the adjustment, as the measurement is only taken after the two lengths or the ends of the links have been moved firmly together under pressure.

This machine includes means for moving the electrodes exactly with the collapse of the link, thus in no way changing the contact area or the current flow into the link during the welding operation.

One important feature of this invention is the provision of means for effecting a heavy push-up during the first part of the link welding operation and a light push-up during a succeeding part. A variable pressure effect is provided by the use of several pistons which are automatically cut in and out of the pressure cycle in such a way that a maximum pressure can be exerted during the first stage of the welding operation, and then the pressure can be cut down to a definite pre-determined value as soon as the link has become sufficiently heated and softened to make its resistance to the higher pressures impractical. The thrust member exerts its full pressure against the cold link, and after a predetermined shove has been effected, which will be of sufficient amount to clean the welded zone of foreign material in the form of a flash, the main piston and one or more auxiliary pistons are actually stopped and the remaining pistons of predetermined sizes continue the shove, upsetting and holding the welded section firm during the actual welding operation and cooling period.

It is desirable to exert a high pressure during the warming period and reduce this pressure as the welding areas approach the plastic state. Without this higher pressure at the start abutting surfaces below the average tend to develop abnormally high resistance resulting in fusing of the metal and showering it out in all directions.

By means of the several pistons telescoping in one cylinder, a variable pressure can be applied during the operation. This arrangement is so made that all but one of the pistons can be used through the entire stroke of the welder, or one or more pistons can be stopped at any pre-determined point in the welding cycle, thus allowing the other pistons to carry through and maintain the required amount of pressure for finishing the welding. This has been found almost necessary in the softer alloy materials. The spring back in a link has to be continually overcome until the weld is of sufficient temperature to withstand the load.

Apparently different materials have different compressive strengths when raised to high temperatures, and this fundamental phenomena of the link material is dealt with by changing the angular position of the stop to furnish the correct reduced pressures.

On some materials the heated zone at the weld is much shorter than on material where the electric conductivity is high. In this case, a much smaller amount of material is heated and, therefore, the pressure required to distort this material is considerably more than on bronzes and material of this nature. It is found necessary therefore on the higher tensile stiffer materials, as stainless steel, to maintain a higher pressure during welding than on the bronzes.

It is always advisable to put as much pressure as possible on a link to be welded prior to reaching the softening point of the material handled, to allow a larger flow of energy into the joint to cause a more rapid heating. If the pressure is low, a sufficient amount of power can not be put through the link to bring the temperature of the joint up to welding in a reasonable commercial time.

On bronzes and metals of high electric and heat conductivity, where a larger area is heated at the welded zone, it is necessary to reduce the pressure as the weld progresses to some predetermined point.

In the operation of the welder, the mechanical pusher comes up against the link immediately followed by the engagement of the associated electrodes with the sides of the link. The hydraulic pusher is then brought up against the link, closing the same and setting a firm pressure against the closed link. At about this point the collar moves firmly against the adjustable stop and causes the electrode pivot bearing to be properly positioned. Hydraulic means brings the electrodes into engagement with the link. Welding current is then supplied and the pressure in the cylinder assembly is maintained at the start of the weld. As the link heats up and the material softens, the hydraulic pusher follows up with a firm pressure until it reaches the point where one of the pistons is cut out by the stop. The current is taken off of the link at a suitable time with respect to the functioning of the stop. The current is cut off by a device which functions entirely independently of the position of the pusher with respect to the bed of the machine and which operates when the amount of shove or compression of the welded link has reached a definite value.

In welding stainless steel it has been found most satisfactory to start the operation on high pressure, to provide a good electrical contact between the ends of the link and to overcome the resistance to closing the link and the initial upsetting of the link, and then to reduce the pressure to a predetermined amount after an initial upsetting operation in which the fused material is forced out of the joint, and maintaining this reduced pressure constant throughout the final upsetting operation and during the cooling period. The initial high pressure can be adjusted by the control means on the pump which also affects the reduced pressure, the relation of which to the initial pressure can be changed by disabling one or more of the pistons. In welding materials of lower conductivity such as steels, particularly alloy steels, the original pressure of closing the link is reduced at or slightly after the welding current has been interrupted. In welding forms of bronze the original pressure of closing the link is maintained up to a short time before the welding current is taken off and then the pressure is reduced for the holding or cooling period which reduced pressure is maintained until the link is sufficiently cooled to recycle the machine. The point in the travel of the take-up during the welding operation at which the pressure is reduced is controlled by the longitudinal adjustment of the control finger 61 and the proportionate amount of reduction in pressure, by an angular adjustment of the control finger 61 to arrest one or more of the pistons after a desired amount of upset has taken place. This point depends upon the characteristics of the material to be welded and is preferably chosen so that the initial high pressure forces the fused material out of the joint and forces the zones of the material which are at welding temperature into molecular locking engagement.

While I have described a preferred embodiment of my invention it will be understood that this is to be taken as illustrative and not limitative and that I reserve the right to make various changes in design, construction, arrangement of parts and mode of operation without departing from the spirit and scope of my invention as pointed out in the following claims.

I claim:

1. An electric resistance welding machine for welding the joint of a chain link, said machine comprising an abutment member for one end of the link, means adapted to move the abutment member to a fixed welding position, a thrust member, means adapted to advance said thrust member against the other end of the link to compress the link between the members, an electrode, means operable in timed relation to the movement of the abutment member to contact said electrode with the link on the side of the joint adjacent the abutment, a second electrode, means operable in timed relation to the advance of the thrust member to contact the second electrode with the link at the opposite side of said joint, means for applying a welding current to the electrodes after they have made contact with the link, and means adapted to advance said second electrode with the thrust member.

2. An electric resistance welding machine for welding the joint of a chain link, said machine comprising an abutment for one end of the link, means adapted to move the abutment to a fixed welding position, a thrust member, means adapted to move said member against the other end of the link to compress the link against the abutment, a pair of electrodes, means operable in timed relation to the movement of the abutment and the thrust member to contact the electrodes with the link at opposite sides of said joint, means for applying a welding current to the electrodes after they have made contact with the link, and means on the thrust member adapted to engage the electrode adjacent thereto at a predetermined point in the compression stroke of said member to advance the electrode with the thrust member.

3. An electric resistance welding machine for welding the joint of a chain link, said machine comprising a pair of thrust members adapted to engage opposite ends of the link, a hydraulic pressure means, at least one of the members being adapted to be advanced by said pressure means to compress the link, said pressure means comprising a plurality of hydraulically operated pistons adapted to bear on the latter member, means for applying a welding current across said joint after said link has been closed, means for arresting one of the pistons upon a predetermined travel of the same to reduce the compressive force on the link during the welding operation, and means for interrupting said welding current after a predetermined amount of travel of another of said pistons measured from the position said latter piston occupied when said joint was closed.

4. An electric resistance welding machine for welding the joint of a chain link, said machine comprising an abutment member and a thrust member adapted respectively to engage opposite ends of the link, hydraulic pressure means comprising a cylinder and a plurality of telescoping pistons operable in the cylinder and adapted to advance the thrust member to compress the link between the two members, means for applying a welding current across said joint after said joint has closed, a stop for arresting one of the pistons to reduce the pressure on the thrust member when the latter has been advanced by the pistons to a given point, and means for interrupting said welding current when said thrust member has been advanced a predetermined distance from the point it occupied when said joint was closed.

5. An electric resistance welding machine for welding the joint of a chain link, said machine comprising an abutment member and a thrust member adapted respectively to engage opposite ends of the link, hydraulic pressure means comprising a cylinder and a plurality of telescoping pistons operable in the cylinder, said pistons being arranged to bear against the thrust member to compress the link between the two members, and selective stop means settable to arrest any or all of the pistons except one at a predetermined point in the pressure stroke of the thrust member so as to reduce the compressive force on the link.

6. An electric resistance welding machine for welding the joint of a chain link, said machine comprising an abutment member and a thrust member adapted respectively to engage opposite ends of the link, hydraulic pressure means comprising a cylinder and a plurality of telescoping pistons operable in the cylinder, said pistons being arranged to bear against the thrust member to compress the link between the two members, and selective stop means settable to arrest any or all of the pistons except one at a predetermined point in the pressure stroke of the thrust member so as to reduce the compressive force on the link, said selective means being adjustable toward and from the welding point to vary the point at which the pistons are arrested.

7. An electric resistance welding machine for welding the joint of a chain link, said machine comprising an abutment member and a thrust member adapted respectively to engage opposite ends of the link, hydraulic pressure means comprising a cylinder and a plurality of telescoping pistons operable therein and adapted to advance the thrust member toward the abutment member to compress the link therebetween, a stop adapted to arrest one or more of the pistons to reduce the pressure on the thrust member when the latter has been advanced to a given point, and means operating in timed relation to such reduction of pressure to pass a welding current through the joint.

8. An electric resistance welding machine for welding the joint of a chain link, said machine comprising an abutment member and a thrust member adapted respectively to engage opposite ends of the link, hydraulic pressure means comprising a cylinder and a plurality of telescoping pistons operable therein and adapted to advance the thrust member toward the abutment member to compress the link therebetween, a stop adapted to arrest one or more of the pistons to reduce the pressure on the thrust member when the latter has been advanced to a predetermined point, means operating in timed relation to such reduction of pressure to pass a welding current through the joint, whereby the link will be softened by the welding current and will continue to be compressed at reduced pressure, and means for interrupting the welding current at a predetermined point in the travel of the thrust member under reduced pressure which point is measured from a point at which the joint in the link is closed.

9. In a machine for welding a joint of a chain link, an abutment member adapted to bear against one end of the link, a thrust member adapted to bear against the opposite end of the link, a main cylinder, a main piston operable therein and adapted to bear against the thrust member, a second cylinder of smaller diameter than the main cylinder, a retracting piston operable therein and connected to the thrust member, a pump adapted to supply hydraulic operating fluid to the two cylinders, means adapted to maintain the delivery side of said pump in constant communication with said second cylinder on the forward side of the retracting piston so as to exert a constant force tending to retract the thrust member, means for connecting the main cylinder to the delivery side of the pump on the rearward side of the main piston, so as to overpower the retracting piston and compress the link between the two members, a valve in the connecting means operable to cut off the main cylinder from the delivery side of the pump and to connect the same to the intake side of the pump, and vice versa.

10. An electric resistance welding machine for welding together a pair of elements that are normally sprung apart, said machine including means for pressing the elements together in abutting relationship, means for passing a welding current through the junction point of the elements while they are pressed together, and means adapted automatically to reduce the pressure to a lower constant value after the elements have been abutted, so as to maintain a lower pressure on said elements while the welding current is applied.

11. An electric resistance welding machine for closing and welding the joint of a chain link, said machine comprising a pair of opposed thrust members relatively movable to compress the link therebtween in such direction as to close said joint, means for applying pressure to the thrust members sufficient to close said joint while the link is cold, means for passing a welding current through said joint after the joint has been closed, and means adapted automatically to reduce said pressure to a lower constant value after a predetermined relative movement of the members.

12. An electric resistance welding machine for closing and welding the joint in a side of a chain link, said machine comprising a pair of opposed thrust members relatively movable to bear against opposite ends of the link, means for applying a pressure to the thrust members sufficient to compress the link and close said joint while the link is cold, means for passing a welding current through said joint after the joint has been closed, and means adapted automatically to reduce said pressure to a lower constant pressure after a predetermined relative movement of the members.

13. An electric resistance welding machine for closing and welding the joint in a side of a chain link, said machine comprising an abutment member adapted to bear against one end of the link, a pair of electrodes, means for operating said electrodes to grip the link at the abutment side of the joint, a thrust member adapted to bear against the opposite end of the link, means for advancing the thrust member against the link with sufficient pressure to close the joint, a second pair of electrodes, means operable in timed relation to the advance of the thrust member to cause said second pair of electrodes to grip the link at the thrust member side of the joint, means for passing a welding current from one pair of electrodes to the other through the joint after the electrodes have gripped the link, means for reducing the pressure on the thrust member whereby the thrust member will assume its advance at a lower pressure during application of the welding current, and means adapted to advance the second pair of electrodes with the thrust member while the welding current is applied.

14. An electric resistance welding machine for closing and welding the joint in a side of a chain link, said machine comprising an abutment member adapted to bear against one end of the link, a pair of electrodes, means for operating said electrodes to grip the link at the abutment side of the joint, a thrust member adapted to bear against the opposite end of the link, means for advancing the thrust member against the link with sufficient pressure to close the joint, a second pair of electrodes, means operable in timed relation to the advance of the thrust member to cause said second pair of electrodes to grip the link at the thrust member side of the joint, means for passing a welding current from one pair of electrodes to the other through the joint after the electrodes have gripped the link, means adapted to advance the second pair of electrodes with the thrust member while the welding current is applied, and means for adjusting the gripping pressure of each pair of electrodes on the link.

15. An electric resistance welding machine for successively closing and welding the joints of a series of chain links of the same dimensions except for variations in manufacture, said machine comprising a pair of opposed thrust members relatively movable to compress the links therebetween in such direction as to close said joints, means for applying pressure to the thrust members sufficient to close said joints while the links are cold but insufficient to prevent stalling of the members when the joints are closed, means for passing welding current through said joints after the joints have been closed whereby the links will be softened and said members will resume relative motion, and adjustable means automatically compensating for said variations in said links for interrupting said welding current upon a predetermined amount of relative movement of said thrust members after such resumption of movement.

16. An electric resistance welding machine for closing and welding the joint of a chain link, said machine comprising a pair of opposed thrust members relatively movable to compress the link therebetween in such direction as to close said joint, means for applying pressure to the thrust members sufficient to close said joint while the link is cold but insufficient to prevent stalling of the members when the joint is closed, means for automatically reducing said pressure to a lower constant value after the joint has been closed, and means for passing a welding current through said joint after the joint has been closed whereby the link will be softened and said members will resume relative movement under such reduced pressure, and a measuring device adapted to interrupt the current upon a predetermined relative movement of the members after such resumption of movement thereof.

17. An electric resistance welding machine for closing and welding the joint of a chain link, said machine comprising a pair of opposed thrust members relatively movable to compress the link therebetween in such direction as to close said joint, means for applying pressure to the thrust members sufficient to close said joint while the link is cold but insufficient to prevent stalling of the members when the joint is closed, means for automatically reducing said pressure to a lower constant value after the joint has been closed, means for adjusting the point in the relative movement of the thrust members at which the pressure is reduced, means for passing a welding current through said joint after the joint has been closed whereby the link will be softened and said members will resume relative movement under such reduced pressure, and a measuring device adapted to interrupt the current upon a predetermined relative movement of the members after the welding current has been applied.

18. An electric resistance welding machine for closing and welding the joint of a chain link, said machine comprising a pair of opposed thrust members relatively movable to compress the link therebetween in such direction as to close said joint, means for applying pressure to the thrust members sufficient to close said joint while the link is cold but insufficient to prevent stalling of the members when the joint is closed, means for automatically reducing said pressure to a lower constant value after the joint has been closed, means for adjusting the degree of reduction of said pressure, means for passing a welding current through said joint after the joint has been closed, whereby the link will be softened and said members will resume relative movement after the welding current has been applied.

19. An electric resistance welding machine for welding the joint of a chain link, said machine comprising an abutment for one end of the link, means adapted to move the abutment to a fixed welding position, a thrust member, means adapted to move said thrust member against the other end of the link to compress the link against the abutment, a pair of electrodes, means operable in timed relation to the movement of the abutment and the thrust member to contact the electrodes with the link at opposite sides of said joint, means for applying a welding current to the electrodes after they have made contact with the link, and means movable in timed relation to the movement of the thrust member to advance the electrode adjacent thereto with the thrust member.

20. An electric resistance welding machine for welding the joint of a chain link, said machine comprising relatively movable members for closing the joint of a link in welding position, means operating under high power to move said members relatively toward each other to close the joint of said link and operable under lower power after said joint has been closed, means for applying a welding current across the joint after said joint has been closed, and means for removing said welding current after a predetermined distance of relative travel of said members under lower power due to the contraction of the link after it has been softened.

21. An electric resistance welding machine for welding the joints of links of variable gap, said machine comprising relatively movable members for closing the variable gaps in successive links, means operating under high power for moving said members relatively toward each other to close the gaps of said links in each instance and operable under lower power after said gaps have been closed, means for applying a welding current across the joint after the gap of a link has been closed, and means for removing said welding current after a predetermined distance of relative travel of said members as they follow the contraction of the link after it has been softened.

22. An electric resistance welding machine for welding the open joint of a chain link, said machine comprising a thrust member adapted to engage the link at one side of the joint, hydraulic means comprising a cylinder and piston means operable therein to move said thrust member to engage said link and close said joint, and means operable in timed relation to the closing of said joint for decreasing the pressure of said piston means on said thrust member and maintaining the pressure on said link at a constant value during the link softening and welding operation.

23. An electric resistance welding machine for welding the open joint of a chain link, said machine comprising a thrust member adapted to engage a link at one side of the joint, hydraulic means comprising a cylinder and piston means operable therein to move said member to engage said link and close said joint, means operable to decrease the pressure of said piston means and maintain the pressure on said link thereafter at a constant value, and means for controlling said pressure decreasing means to become effective after said link has softened and has been contracted by said thrust member.

24. In a welding machine of the character described the combination of an abutment member mounted for longitudinal movement on the bed of the machine, means for moving said abutment member into position to engage a link in welding position, a pair of electrodes for engagement with the sides of the link on the same side of the gap of the link as the abutment member, means for pivotally supporting said electrodes on the bed of the machine, and means for engaging said electrodes with the sides of the link after said abutment member has been moved into engagement with said link.

25. In a machine of the class described the combination of a longitudinally movable thrust member, means carried by the bed of the machine for supporting and moving said thrust member into engagement with a link in welding position to close the gap in said link, a pair of electrodes adapted to cooperate with the sides of the link on the side of the gap adjacent said thrust member, means for pivotally supporting said electrodes, means for slidably supporting said pivot means on the bed of the machine, means for moving said electrodes into engagement with the sides of said link, means for applying a welding current, and means for advancing said electrodes with the thrust member as said thrust member moves forward due to softening of the link by the welding current.

26. In a machine of the character described, the combination of a thrust member movable to close the gap in a link in welding position and to contract said link after said link has been softened, a pressure cylinder, a piston in said cylinder operatively associated with said thrust member, a source of constant fluid pressure for said cylinder, means for reducing the pressure on said thrust member when the link has been closed, and means for maintaining the pressure on said thrust member constant during a welding operation.

27. In a resistance welding machine the combination of a thrust member adapted to engage and close the gap in a link to be welded and to contract the joint during a welding operation, hydraulic means adapted to exert a sufficient predetermined pressure on said thrust member to cause said thrust member to close gaps of different widths at the joints of successive links, but insufficient to prevent it from stalling after said gaps have been closed, and adapted to resume its operation under lower pressure after said link has been softened during a welding operaton, means for applyng a welding current across said joint after the joint has been closed, and means for interrupting the welding current after a predetermined amount of movement of said thrust member during such resumed operation.

28. In a welding machine, the combination of a movable thrust member for closing the joint in a link to be welded and for compressing the link during the welding operation, means for exerting any desired initial high pressure on said thrust member to close the joint in the link and to compress the link any desired amount for any desired part of the welding operation, and means for then reducing said pressure to a desired value and maintaining such pressure constant during the remainder of the welding operation.

29. In a welding machine, the combination of a movable thrust member for closing the joint in a link to be welded and for compressing the link during the welding operation, means for exerting any desired initial high pressure on said thrust member to close the joint in said link and to compress the link during at least a part of the welding operation, means for reducing said pressure to a desired value at any desired stage during the welding operation, means for applying a welding current across the joint of said link, and means for interrupting said welding current after any desired amount of compression of the link has been effected during the welding operation.

30. In a welding machine, the combination of a movable thrust member for closing the joint in a link and for compressing the link during a welding operation, electrodes engageable with the ends of said link near the joint, and means for moving said electrodes with the link ends as the link is compressed by said thrust member during the welding operation.

31. In a welding machine, the combination of a movable thrust member operable to close the joint in a link, and to compress the link during a welding operation, means for applying a welding current across the joint of the link after said joint has been closed, and adjustable means automatically compensating for variations in the size of links, for interrupting said welding current after a predetermined definite amount of compression of the link during the link softening and welding operation.

32. In a welding machine, the combination of a movable thrust member operable to close the gap in a link and to compress the link during a welding operation, means for applying a welding current across the ends of the link after the gap has been closed, and adjustable means compensating for variations in the length of gaps in links, for interrupting said welding current after a predetermined definite amount of compression of said link during the link softening and welding operation.

HOWARD A. DELANO.